United States Patent [19]

Keys et al.

[11] Patent Number: 4,968,352
[45] Date of Patent: Nov. 6, 1990

[54] DIARYL PIGMENTS WITH IMPROVED HEAT STABILITY AND TRANSPARENCY CONTAINING COUPLED MIXED BIS-DIAZOTIZED DIAMINES AND ACID-SUBSTITUTED AROMATIC AMINES

[75] Inventors: Boyd A. Keys, Providence; John T. Ouderkirk, Westerly, both of R.I.

[73] Assignee: Hoechst Celanese Corporation, Somerville, N.J.

[21] Appl. No.: 187,623

[22] Filed: Apr. 28, 1988

[51] Int. Cl.$^5$ .............. C09B 67/06; C09B 67/20; C09B 67/22

[52] U.S. Cl. ............... 106/494; 106/22; 106/23; 106/496; 534/573; 534/747; 534/740; 534/887; 534/760

[58] Field of Search ............... 534/573 M; 106/288 Q, 106/496, 494

[56] References Cited

U.S. PATENT DOCUMENTS

| | | | |
|---|---|---|---|
| 2,431,889 | 12/1947 | Popkin | 534/573 M X |
| 3,617,171 | 11/1971 | Ribka | 534/573 M X |
| 3,759,731 | 9/1973 | Kuhne et al. | 534/573 M X |
| 3,775,148 | 11/1973 | Bradley | 106/288 Q |
| 3,776,749 | 12/1973 | McKay et al. | 106/288 Q |
| 3,872,078 | 3/1975 | Cseh et al. | 106/496 X |
| 3,978,038 | 8/1976 | Cseh et al. | 106/496 X |
| 4,055,559 | 10/1977 | Cseh et al. | 106/496 X |
| 4,081,439 | 3/1978 | Hari et al. | 106/496 X |
| 4,206,114 | 6/1980 | Roueche | 106/496 X |
| 4,399,068 | 8/1983 | Kramer | 534/573 M X |
| 4,665,163 | 5/1987 | Hunger et al. | 534/573 M |

FOREIGN PATENT DOCUMENTS

| | | | |
|---|---|---|---|
| 12944 | 7/1980 | European Pat. Off. | 534/573 M |
| 3109579 | 10/1982 | Fed. Rep. of Germany | 534/573 M |
| 3329846 | 2/1985 | Fed. Rep. of Germany | 534/573 M |
| 1356254 | 6/1974 | United Kingdom | 534/573 M |
| 2160212 | 12/1985 | United Kingdom | 534/573 M |

*Primary Examiner*—Floyd D. Higel
*Attorney, Agent, or Firm*—Perman & Green

[57] ABSTRACT

Diaryl pigments having excellent dried ink transparency and improved process heat stability are prepared by carrying out the coupling of a bisdiazotized substituted 4,4′ diaminobiphenyl with acetoacetanilides and/or pyrazolinones in the presence of an added quantity of one or more substituted aromatic amines containing at least one sulfonic or carboxylic acid substituent, or their salts. The pigments exhibit improved tolerance to variations in drying temperatures and to high drying temperatures, and have improved transparency when present in dried ink formulations.

21 Claims, No Drawings

DIARYL PIGMENTS WITH IMPROVED HEAT STABILITY AND TRANSPARENCY CONTAINING COUPLED MIXED BIS-DIAZOTIZED DIAMINES AND ACID-SUBSTITUTED AROMATIC AMINES

BACKGROUND OF THE INVENTION

1. Technical Field

The present invention relates to diaryl azo pigments exhibiting improved process heat stability and to printing inks containing them having improved dried ink transparency.

2. Background

Diaryl pigments are well known in the art and are particularly useful as coloring components in various types of printing inks, as well as coloring components for paints and plastics. Typical of such pigments are those prepared by coupling bis-diazotized 3,3'-dichloro-4,4'-diaminobiphenyl with an acetoacetarylide such as acetoacetanilide (also known as acetoacetylated aniline).

A particularly desirable application for such pigments is as a coloring component in solvent based printing inks containing alcohol, which are used for packaging or label printing.

A most important characteristic for such pigments would be that they produce inks that are very transparent over metal foil. In the ideal case of a completely dispersed pigment, transparency relates to the primary pigment particle size. Generally a pigment composed of smaller particles gives more transparency. However, in reality, transparency also relates to the amount of pigment dispersion achieved in the ink. Dispersability is related to forces that bind individual particles together. These forces can be simply termed "weak" which is known as "agglomeration" or "strong" which is also known as "aggregation". These forces can be depicted as either edge-to-edge or edge-to-face binding in the case of agglomeration or as face-to-face binding in the case of aggregation. Therefore transparency is strongly influenced by the particle aggregation-agglomeration phenomenon which must be considered during the development of a pigment product.

Transparency and dispersability also relate to particle size distribution. If the primary pigment particles have a broad size distribution the larger-than-average particles may give a disproportionately large decrease in the transparency than the smaller-than-average particles give toward increasing the transparency. A wider particle size distribution also decreases dispersability in the ink medium by increasing aggregation. Two pigments with the same average particle size but with different particle size distributions can thus have quite different effective transparencies.

While it is possible to provide pigments having good dried ink transparency in the laboratory, it has been the experience that a significant loss of transparency occurs when the laboratory process is scaled up to production. This is believed caused by the fact that a loss of dried ink transparency properties occurs during the drying of production pigment presscake. Drying times and temperatures may vary in production, and a narrow processing temperature window below about 90° C. needs to be maintained to preserve the dried ink transparency properties of the pigment. Also, the pigments are not sufficiently heat stable at temperatures where the production pigment may be more efficiently dried (90° C. or more). Other contributing factors to the loss of transparency are thought to be caused by changes in the amount of aggregation-agglomeration bonding of the pigment particles as a consequence of the presscake extrusion, drying and milling operations.

It is disclosed in UK Patent application No. 2160212A that the solution stability of printing inks containing metal salt, naphthol-type azo pigments can be improved by incorporating into such pigments minor amounts of the diazonium salt of an aromatic amine having a carboxylic acid group or sulfonic acid group, meta or para to the amino position, coupled with beta-naphthol or beta-hydroxynaphthoic acid. The incorporation may be made by blending the naphthol-type azo pigment with the coupled aromatic amine or by co-coupling during the production of the metal salt azo pigment. In addition, U.S Pat. No. 4,665,163 discloses that the heat stability of certain diaryl pigments may be improved by coupling bis-diazotized 3,3'-dichloro-4,4'-diaminobiphenyl with a mixture of two different acetoacetanilides, one of which has an amino or amido-containing substituent group on the phenyl ring. This improvement in heat stability permits the pigments to be utilized for pigmenting plastics processed at temperature in excess of 200° C., without degrading or color changes. The former reference (UK) relates to a pigment of a different chemical class than the pigments of this invention. Also, neither of these disclosures relate to the production of diaryl type pigments exhibiting improved transparency in printing ink formulations.

SUMMARY OF THE INVENTION

The present invention relates to pigments exhibiting both good heat stability and dried ink transparency which are obtained by coupling a bis-diazotized substituted benzidine having the formula A:

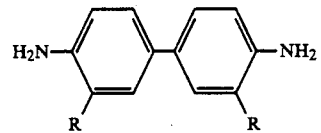

A

Wherein: R is selected from the group consisting of halogen, $C_1$ to $C_3$ alkyl or $C_1$ to $C_4$ alkoxy; with acetoacetanilides having the formula B-1 or B-2, or with pyrazolinoies having the formula B-3, as well as mixtures of combinations of B-1, B-2 and/or B-3:

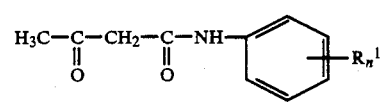

B-1 in which the $R^1$s are independently selected from the group consisting of hydrogen, hydroxy, $C_1$ to $C_4$ alkyl, $C_1$ to $C_4$ alkoxy, $NO_2$, halogen and

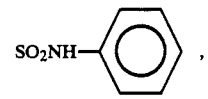

and n denotes an integer from 1-3, and

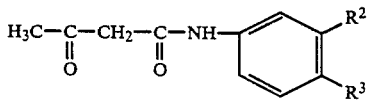 B-2 in which $R^2$ and $R^3$ each denote the radical:

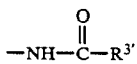

wherein $R^{3'}$ is a $C_1$ to $C_6$ alkyl group, or one of the radicals $R^2$ and $R^3$ denotes a hydrogen atom and the other denotes a radical selected from the group consisting of:

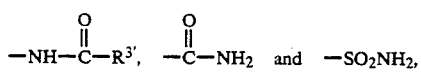

wherein $R^{3'}$ has the meaning given above, or $R^2$ and $R^3$ linked to one another denote a divalent radical of the series:

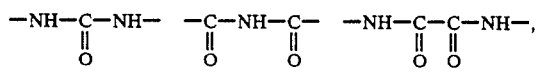

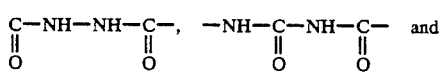

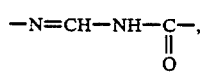

the terminal bonds being attached to the phenyl nucleus at the 3 position and the 4 position, and

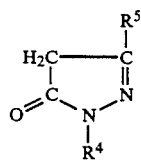 B-3 in which $R^4$ denotes a phenyl group or a $C_1$ to $C_3$ alkyl substituted phenyl group, and $R^5$ denotes hydrogen or a $C_1$ to $C_3$ alkyl group, and with a diazotized primary aromatic amine having the formulas C-1, C-2, C-3 C-4 or C-5, as well as mixtures of such amines:

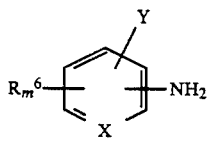 C-1 wherein Y is a carboxylic acid group or a sulfonic acid group or a salt thereof, $R^6$ is selected from the group consisting of halogen, hydrogen, $C_1$ to $C_4$ alkyl, carboxylic acid or alkali or alkaline earth metal salt thereof, sulfonic acid or alkali or alkaline earth metal salt thereof, amino, aryl, and $OR^7$ wherein $R^7$ is aryl or $C_1$ to $C_4$ alkyl, X is C, N, O or S, and m is an integer of 1 or 2,

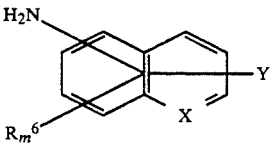 C-2 wherein Y, $R^6$ and m have the meanings set forth above,

 C-3 wherein $R^6$ and Y have the meanings given above,

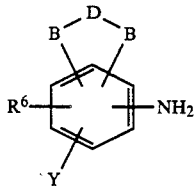 C-4 wherein $R^6$ and Y have the meanings given above and B and D are independently selected from the group consisting of O, N, C and $(CH_2)p$ where p denotes an integer of 1 or 2,

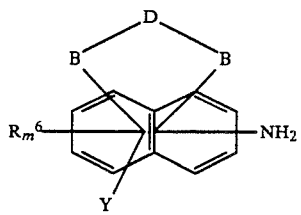 C-5 wherein $R^6$, B, D, Y and m have the meanings given above.

Approximately stiochiometric quantities of the diazotized and non-diazotized components of the categories A, B and C are coupled to form the pigments of this invention. Generally, the amount of one or more component C compounds employed is sufficient to constitute from about 0.25 to about 15% by weight of the final pigment, more preferably from about 0.5 to 5% by weight. Preferably, component C compounds are employed at a level of about 0.1 to about 15 mole percent, more preferably from about 0.25 to about 2.5 mole percent, based on the moles of component B coupler. Each of components C-1 to C-5 may be used alone (100%) or may be used in admixture, preferably with component C-1 or C-2 constituting at least about 50% by weight of said mixture.

Each of components B-1 or B-2 or B-3 can be used alone (100%). Where mixtures of components B-1 and B-2 and/or B-3 are included in the coupling reaction, the amount of component B-2 and/or B-3 is preferably in the range of from about 0.5 to about 10 mole %, more preferably from about 1 to about 3 mol %, based on the quantity of B-1 and B-2 and/or B-3 taken together.

The pigments are recovered from the water based reaction slurry after completion of the coupling reaction by filtering to form a presscake, washing and drying the presscake, and grinding.

DETAILED DESCRIPTION OF THE INVENTION

As indicated above, inclusion of one or more components of the general category C into the coupling reaction gives rise to diaryl type pigments of improved heat stability and increased transparency when formulated into printing inks. It is proposed that these effects are due to the coupling in-situ of diazotized compounds of the formula C category with compounds of the B category. For example, coupling reactions involving compounds C-1 or C-2 and compounds B-1 or B-2 would yield a pigment of the structure:

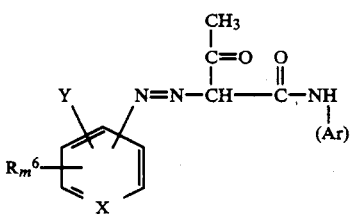   D.

wherein (Ar) is the aromatic moiety of compound B-1 or B-2, and $R^6$, Y, X and m have the meanings given above.

The main coupling reaction which generates the pigment having increased heat stability and dried ink transparency involves the coupling of the bis-diazo compounds of formula A with compounds of the B category. For example, coupling reactions involving compound A and compounds B-1 or B-2 would yield a pigment of the structure E:

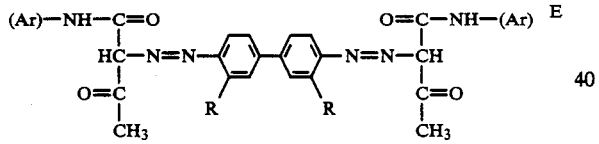   E wherein (AR) is the aromatic moiety of compound B-1 or B-2, and R has the meaning given above.

It is not certain in what manner the presence of minor amounts of formula D type compounds affects the dispersibility and dried ink transparency of the primary pigment of the formula E type. However it is necessary that the formula D type compounds be generated in-situ (co-coupled) during the coupling reaction which yields the primary pigment of the formula E type. As will be shown, a mechanical blend of separately produced compounds of the formula D type and the formula E type does not demonstrate the same transparency as the co-coupled pigment. The presence of this second compound of the formula D type during the coupling reaction leading to the formation of the primary pigment of the formula E type may inhibit the growth of primary pigment particles, thereby making them more transparent, or it may cause the dispersability of the primary pigment to be increased by the accumulation of acid groups (sulfonic or carboxylic) on the surface of the particles thus increasing their ability to wet-out and decreasing their tendency to aggregate. The effect may also be due to an alteration of the crystal lattice structure of the primary pigment molecules. In any event, it has been found that pigments produced within the scope of this invention exhibit less sensitivity to temperature variations during the drying of the pigment presscake. Pigments according to the present invention may be, and preferably are, dried at temperatures in excess of about 90° C. while at the same time maintaining or enhancing the dried ink transparency of similar unmodified pigments dried at lower temperatures, e.g., dried at about 60° C.

Preferred substituted bis-diazo benzidine compounds which may be employed as the formula A compound include 3,3'-dichloro-4,4'-diaminobiphenyl, 3,3'-dimethoxy-4,4'-diaminobiphenyl, and 3,3'-dimethyl-4,4'-diaminobiphenyl. The di-chloro substituted biphenyl is most preferred.

The acetoacetanilides of formula B-1 used as coupling component are preferably acetoaceto-2-methyl anilide, acetoaceto- 2-methyoxyanilide, acetoaceto-4-ethoxyanilide, acetoaceto-2,4-dimethylanilide, aceto aceto-2-methyl-4-chloroanilide, acetoaceto-2-methoxy-5-chloroanilide acetoaceto-2,4-dimethoxy-5-chloranilide, and acetoaceto-2,5-dimethoxy-4-chloroanilide.

Compounds of the formula B-2 are preferably those in which $R^2$ denotes a hydrogen atom and $R^3$ denotes a radical:

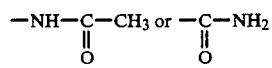

or conversely $R^2$ and $R^3$ linked to one another represent a radical of the series:

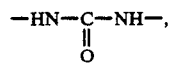

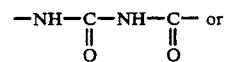

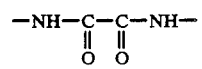

Examples of preferred B-2 compounds include 6-acetoacetylaminotetrahydroquinazoline- 2,4-dione, 7-aceto acetylaminotetrahydroquinazoline- 2,4 -dione, 6-aceto acetylaminotetrahydroquinoxaline- 2,3-dione, and 5-aceto acetylaminobenzimiazolone.

Examples of preferred B-3 compounds include 3-methyl-1-phenyl-2-pyrazolin-5-one and 3-methyl-1-toluyl-2-pyrazolin-5-one.

Compounds of the formula C-1 category which may be employed include preferably 2-amino-5-methylbenzene sulfonic acid, 2-amino -5-methoxybenzene sulfonic acid, 2-aminobenzoic acid, 3-amino-6-methylebenzene sulfonic acid, 4-aminobenzene sulfonic acid, 1-amino -4-chloro-5- methylbenzene sulfonic acid and salts thereof. The 2-amino-5-methylbenzene sulfonic acid is most preferred. These acids may be employed per se or as a salt, for example an alkali or alkaline earth metal salt.

A preferred compound of the formula C-2 category is 2-amino-1-naphthalene sulfonic acid or an alkali or alkaline earth metal salt thereof.

A preferred compound of the formula C-3 category is 2,2'- disulfobenzidene or an alkali or alkaline earth metal salt thereof.

A preferred compound of the formula C-4 category is 4-amino-7-sulfoindazole or an alkali or alkaline earth metal salt thereof.

A preferred compound of the formula C-5 category is 1-amino-4-bromo-2- sulfoanthraquinone or an alkali or alkaline earth metal salt thereof.

The diazotization of compounds of the formula A and C categories is effected in a known manner by means of alkali metal nitrites or lower alkyl nitrites together with adequately strong acids, in particular mineral acids, for example hydrochloric acid or sulfuric acid. It can also be carried out using nitrosylsulfuric acid. Compounds of the categories A and C may be first diazotized together to form a mixed diazo product prior to coupling with the category B compound, or the C compound may be diazotized in-situ during the coupling reaction of the diazotized A compound and the B compound, in the presence of excess nitrite. Most preferably, the category A and C compounds are first diazotized to form the mixed diazo prior to the coupling reaction. In this reaction, and also in the subsequent coupling reaction, it can be beneficial to use added surface-active agents, for example non-ionic, or anionic or cationic dispersing agents.

Examples of surface-active agents of this type are anionic substances, such as fatty acid taurides, fatty acid N-methyltaurides, fatty acid isothionates, alkylbenene-sulfonates, alkylnaphthalenesulfonates, alkylphenol polyglycol ether-sulfates and fatty alcohol polyglycol ether-sulfates; fatty acids, such as palmitic, stearic and oleic acids; soaps, such as alkali metal salts of fatty acids, naphthenic acids and resin acids, such as abietic acid; alkali-soluble resins, such as colophony-modified maleate resins; cationic substances, such as quaternary ammonium salts, N-oxides of tertiary amines or salts thereof, fatty amines and oxethylated derivatives thereof; or non-ionic substances, such as fatty alcohol polyglycol ethers (ethoxylated fatty alcohols), fatty acid polyglycol esters, alkylphenol polyglycol ethers and dialkyl polyglycol ethers.

The surface-active agents can be added individually or as mixtures. The amount can vary within wide limits, in general, 0.1 to 20% by weight, preferably 1 to 10% by weight, relative to the pigment being employed.

The procedure followed before the coupling is to dissolve one or more compounds of the category B formula in a basic solution, preferably an aqueous alkali metal hydroxide solution. The coupling may be carried out using this solution, or the compound may be re-precipitated with an acid and the coupling carried out using the resulting suspension.

The diazotization and coupling can also be carried out in the presence of suitable organic solvents, for example acetic acid, lower alkanols, formamide, dimethylformamide, dimethyl sulfoxide, pyridine or N-methylpyrrolidone.

It is often advantageous, in order to achieve the full tinctorial strength and a particularly favorable crystal structure, to heat the reaction mixture after the coupling, for example to heat it to reflux temperature for about 1 to 3 hours, or to keep it at temperatures above 100° C. under pressure, if appropriate in the presence of organic solvents or in the presence of resin soaps or other soluble resins. Readily dispersible pigments are obtained using the products according the invention if, after the coupling, the moist presscakes or the dried powders are subjected to the thermal aftertreatment mentioned, if appropriate together with organic solvents, or if the pigments are subsequently ground with the addition of grinding auxiliaries.

The preparation of the pigments can also be carried out in the presence of a carrier material, for example barite.

The compounds according to the invention are insoluble in water and in the customary organic solvents, and are suitable for pigmenting printing inks, gloss paints and emulsion paints and for coloring rubber, plastics and natural or synthetic resins. They are suitable for pigmenting plastics such as polyolefins, polyvinyl chloride, polyurethanes, polyacrylonitrile or polydiodol dicarboxylates, for example polyglycol terphthalates. They are also suitable for pigment printing on substrates, in particular textile fiber material or other sheet like structures, for example paper.

The following Examples are illustrative of the invention.

EXAMPLE 1

Fifty (50) parts by weight of 3,3'-dichlorobenzidene was agitated overnight along with 250 parts by weight water and 61 parts by weight of 31.5% hydrochloric acid at room temperature. This mixture was cooled to 0°-5° C. by the addition of ice. Then 68.5 parts of 40% sodium nitrite solution was rapidly added subsurface over a period of 3-5 minutes. Excess nitrite was maintained for one hour and then destroyed by the addition of the minimum amount necessary of sulfamic acid to give the diazo component (Solution 1).

In a separate vessel, 109 parts by weight of acetoacetylated-2, 5-dimethoxy - 4- chloroaniline is agitated with 500 parts by weight water and 48 parts by weight sodium hydroxide solution at room temperature, and is completely dissolved (Solution 2).

In a third vessel, 43 parts by weight glacial acetic acid, 22 parts by weight of a surfactant mixture, and 1,000 parts by weight water are agitated and dissolved. This solution is cooled to 0° C. by the addition of ice, and then Solution 2 is added over a period of about 20 minutes. The temperature of the resulting coupling component mixture is adjusted to 10° C., after which the diazo component (Solution 1) is added to the coupling component over a period of from about 1 to 1.5 hours until the formation of the pigment component is judged complete as evidenced by the consumption of Solution 2. Subsequently, 42 parts by weight of 31.5% hydrochloric acid is added to the pigment mixture.

A separately prepared mixture of 56 parts by weight of wood resin is agitated along with 28 parts by weight of 50% sodium hydroxide solution at 40° C. until the resin is dissolved. The resin solution is then added to the pigment mixture over a period of 20 minutes. The resulting pigment-resin mixture is heated to 100° C. by internal steam for one hour, then cooled to 70° C. by the addition of water.

The resulting slurry is filtered and washed to obtain a pigment presscake. The presscake is dried in a hot air circulation oven at 60° C. for 24 hours to yield about 210 parts by weight of a yellow pigment having the structure:

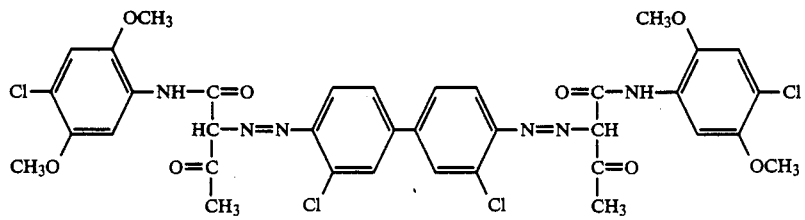

EXAMPLES 2-19

Example 1 was repeated as set forth above except that differing quantities of various aromatic acid amines within the scope of formula C category compounds and as designated in Table 1 were added to the 3,3'-dichlorobenzidene prior to the addition of sodium nitrite. This resulted in a mixed diazotization of the 3,3'-dichlorobenzidene and the aromatic amine. Drying temperatures for the various presscakes produced are designated in Table 1.

The pigments from Examples 1-19 were ground and formulated into a printing ink as follows. Eighty parts of an ink vehicle composed of ethanol, ethyl acetate and dibutyl phthalate and one quarter second ss nitrocellulose, 20 parts of pigment and steel shot are placed in a steel cylinder. The mixture is then dispersed by the action of a paint shaker for one hour. The resulting ink is then drawndown over aluminum foil using a #4 Meier rod, and dried.

The drawdowns are evaluated visually under industry standardized lighting conditions. Perceived differences in transparency and color characteristics as compared with the control (Example 1) as a standard are expressed as numbers between 5+ and 5− by the following designations:

5+ much more transparent
4+ considerably more transparent
3+ distinctly more transparent
2+ slightly more transparent
1+ trace more transparent
− equal in transparency
1− trace less transparent
2− slightly less transparent
3− distinctly less transparent
4− considerably less transparent
5− much less transparent

TABLE 1

| | Additive of Formula (C) | % by Mol | Drying Temperature (°C.) | Transparency Over Foil | Shade |
|---|---|---|---|---|---|
| Ex 1 | — | — | 60° | std. | std |
| Ex 2 | 2-amino-1-naphthalene sulfonic acid | 1.00 | 60° | 4+ | equal |
| Ex 3 | 2-amino-1-naphchalene sulfonic acid | 3.00 | 60° | 4/5+ | slightly red |
| Ex 4 | 2-aminobenzoic acid | 5.00 | 60° | ⅜+ | trace lighter |
| Ex 5 | -2-aminobenzoic acid | 5.00 | 90° | ⅜+ | trace lighter |
| Ex 6 | 4-aminobenzene sulfonic acid | 5.00 | 60° | 4/5+ | trace lighter |
| Ex 7 | 4-aminobenzene sulfonic acid | 5.00 | 90° | 4/5+ | trace lighter |
| Ex 8 | 3-amino-6-methylbenzene sulfonic acid | 5.00 | 60° | 4/5+ | trace lighter |
| Ex 9 | 3-amino-6-methylbenzene sulfonic acid | 5.00 | 90° | 4+ | slightly light |
| Ex 10 | aniline-2-sulfonic acid | 5.00 | 60° | 4+ | trace lighter |
| Ex 11 | aniline-2-sulfonic acid | 5.00 | 90° | 3+ | trace lighter |
| Ex 12 | 4-amino benzoic acid | 5.00 | 60° | 2+ | slightly light |
| Ex 13 | 4-amino benzoic acid | 5.00 | 90° | 1+ | distinctly light |
| Ex 14 | 2-amino-5-methylbenzene sulfonic acid | 1.00 | 60° | 4/5+ | trace lighter |
| Ex 15 | 2-amino-5-methylbenzene sulfonic acid | 1.00 | 90° | 4/5+ | trace lighter |
| Ex 16 | 2-amino-5-methylbenzene sulfonic acid | 3.00 | 60° | 4/5+ | trace lighter |
| Ex 17 | 2-amino-5-methylbenzene sulfonic acid | 3.00 | 90° | 4/5+ | equal |
| Ex 18 | 2-amino-5-methylbenzene | 5.00 | 60° | 4/5+ | equal |

TABLE 1-continued

| | Additive of Formula (C) | % by Mol | Drying Temperature (°C.) | Transparency Over Foil | Shade |
|---|---|---|---|---|---|
| Ex 19 | sulfonic acid 2-amino-5-methylbenzene sulfonic acid | 5.00 | 90° | 4+ | equal |

As can be demonstrated from the data of Table 1, the inclusion of minor amounts of the various aromatic acid amines of the present invention into the pigment structure represented by the formula of Example 1 gave rise to a marked increase in the transparency of the dried ink pigment as compared with the standard, whether dried at 60° C. or 90° C. In most cases there was little alteration of the shade of the pigment.

As indicated above, it is necessary that the aromatic acid amine be present in the reaction media during the coupling reaction. It has been found that simple mixtures of pigment such as produced in Example 1 and the coupled reaction product of a diazotized aromatic acid amine of the formula C Category with a Category B compound (such as depicted by formula D) does not give rise to improved dried ink transparency, and in fact transparency is diminished. This is established as follows:

EXAMPLE 20

A solution of 74.8 parts of 2-amino-5-methylbenzene sulfonic acid and 32.8 parts of 50% sodium hydroxide solution was added dropwise over 15 minutes to a solution of 120 parts 31.5% hydrochloric acid and 600 parts water at 0° C. The temperature of the mixture was kept between 0°-5° C., and 72.0 parts of 40% sodium nitrite solution was added subsurfae over 20 minutes. Excess nitrite was maintained for one hour then removed by the addition of the minimum amount necessary of sulfamic acid to give the diazo component. In a separate vessel, 109 parts of acetoacetylated-2,5-dimethoxy-4-chloroaniline (ADC) was agitated with 500 parts water and 48 parts of 50% sodium hydroxide solution at room temperature until it completely dissolved.

In a third vessel, 43 parts acetic acid, 22 parts of a surfactant mixture, and 1000 parts water were agitated and dissolved. This solution is cooled to 0° C. by the addition of ice, then to it was added the ADC solution over 20 minutes. The temperature of the resulting coupling component mixture was adjusted to 10° C. The diazo component was then added to the coupling component over 1–1.5 hours until the formation of the pigment is judged complete, as evidenced by the consumption of the ADC. Subsequently, 42 parts of 31.5% hydrochloric acid is added to the pigment mixture. In a different container, 56 parts of wood resin was agitated along with 28 parts of 50% sodium hydroxide at 40° C. until the resin is dissolved. The resin solution is added to the pigment mixture over 20 minutes. The resulting pigment resin mixture was heated to 100° C. by internal steam of one hour, then it was cooled to 70° C. by the addition of water.

The slurry was then filtered and washed to obtain the pigment presscake. The presscake is dried in a hot air circulation oven at 60° C. for 24 hours at 110° C. for 3 hours to give a yellow pigment having the formula:

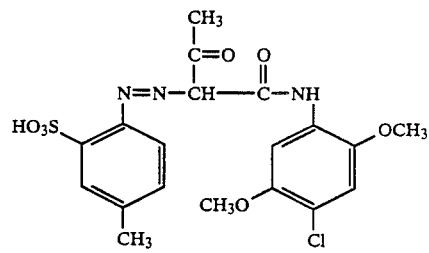

The resulting pigment was ground and then thoroughly blended with the unmodified pigment prepared in Example 1 at a level of addition of 5% by weight.

Inks were prepared and draw downs were made on aluminum foil and a black substrate by the techniques disclosed above. Transparency was evaluated by the methods disclosed above and compared with the samples of Examples 18 and 19 as standards.

These latter samples represent pigment wherein the diazotized 2-amino-5-methyl benzene sulfonic acid is present in the reaction medium during coupling at a level of 5 mol %, and dried at 60° C. and 90° C. respectively. Results are shown in Table 2.

TABLE 2

| SAMPLE DESCRIPTION | DRYING TEMP (°C.) | TRANSPARENCY OVER FOIL | TRANSPARENCY OVER BLACK |
|---|---|---|---|
| Ex 18 | 60° | Standard | Standard |
| Ex 20 (blend) | 60° | 5− | 5− |
| Ex 19 | 90° | Standard | Standard |
| Ex 20 (blend) | 90° | 5− | 5− |

As can be seen from Table 2, a blend of the pigment of Example 1 containing 5% by weight of the pigment of Example 20 is much less transparent when compared to the pigments of Examples 18 and 19 as standards which were prepared by the in-situ reaction.

EXAMPLE 21

Example 1 was repeated exactly as set forth except that the coupling component B-1 employed consisted of 82.3 parts by weight of acetoacetylated-2,4-dimethyl aniline.

The presscake was split and one portion dried at 60° C. and the other portion was dried at 110° C.

EXAMPLE 22

Example 21 was repeated except that 3.8 parts by weight (5 mol %) of 2-amino-5-methylbenzene sulfonic acid was added to the 3,3'-dichlorobenzidine prior to the addition of the sodium nitrite, giving rise to the mixed diazo product. The presscake was split and one portion dried at 60° C. and the other portion dried at 110° C.

EXAMPLE 23

Example 1 was repeated exactly as set forth except that the coupling component B-1 consisted of 71.0 parts by weight of acetoacetylated-2-methyl aniline. Split presscakes were dried at 60° C. and 110° C. respectively.

EXAMPLE 24

Example 23 was repeated except that 3.8 parts by weight (5 mol %) of 2-amino-5-methylbenzene sulfonic acid was added to the 3,3-dichlorobenzidine prior to the addition of the sodium nitrite, giving rise to the mixed diazo product. Split presscakes were dried at 60° C. and 110° C., respectively.

Ink formulations and drawdowns on aluminum foil were prepared as described above from each pigment sample of Examples 21–24. In addition, a lithographic ink formulation was prepared by mixing 2.0 parts by weight of varnish and 1.0 part by weight pigment on a glass plate to form a paste. This paste was then ground by 6 passes on a three roll mill. Drawdowns of the lithographic inks were made on white bond stock using a drawdown knife.

An evaluation of transparency of the various inks is reported in Table 3.

TABLE 3

| Sample Description | Drying Temp. (°C.) | Ink** Transparency | Litho Ink Transparency |
|---|---|---|---|
| Example 21 | 60° | Std | (NT)* |
| Example 22 | 60° | 3+ | (NT) |
| Example 21 | 110° | Std | Std |
| Example 22 | 110° | 5+ | 4+ |
| Example 23 | 60° | Std | (NT) |
| Example 24 | 60° | equal | (NT) |
| Example 23 | 110° | Std | Std |
| Example 24 | 110° | 3+ | 2+ |

*NT - Not tested
**Nitrocellulose ink transparency

The data of Table 3 demonstrates a significant improvement in dried ink transparency in both nitrocellulose based inks and lithographic inks for pigments prepared in accordance with the present invention as compared with unmodified pigments. This improvement is more particularly marked where the pigments are dried at 110° C. as compared with those dried at 60° C.

What is claimed is:

1. A process for preparing a diaryl pigment having improved dried ink transparency and improved process heat stability, said pigment obtained by coupling a bis-diazotized compound having the formula A:

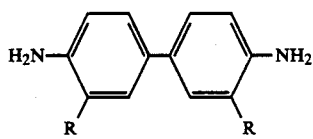

wherein:
R is selected from the group consisting of halogen, $C_1$ to $C_3$ alkyl or $C_1$ to $C_4$ alkoxy;
with acetoacetanilides having the formula B-1 or B-2, or with pyrazolinones having the formula B-3, as well as mixtures of combinations of B-1, B-2 or B-3:

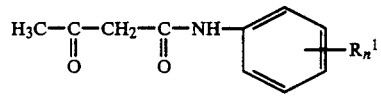

in which the $R^1$s are independently selected from the group consisting of hydrogen, hydroxy, $C_1$ to $C_4$ alkyl, $C_1$ to $C_4$ alkoxy, $NO_2$, halogen and

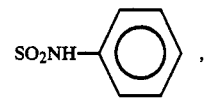

and n denotes an integer from 1–3, and

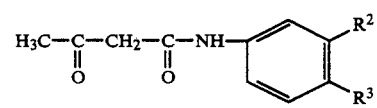

in which $R^2$ and $R^3$ each denote the radical:

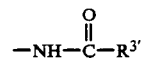

wherein $R^{3'}$ is a $C_1$ to $C_6$ alkyl group,
or one of the radicals $R^2$ and $R^3$ denotes a hydrogen atom and the other denotes a radical selected from the group consisting of:

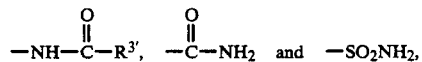

wherein $R^{3'}$ has the meaning given above,
or $R^2$ and $R^3$ linked to one another denote a divalent radical selected from the group consisting of:

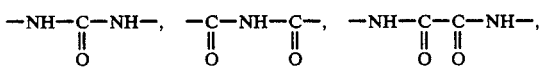

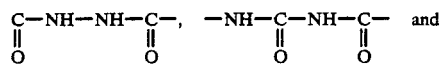

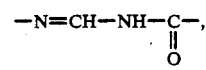

the terminal bonds being attached to the phenyl nucleus at the 3 position and the 4 position, and

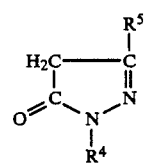

in which $R^4$ denotes a phenyl group or a $C_1$ to $C_3$ alkyl substituted phenyl group, and $R^5$ denotes hydrogen or a $C_1$ to $C_3$ alkyl group, and with a diazotized primary aromatic amine having the formulas C-1, C-2, C-3 C-4 or C-5, as well as mixtures of such amines:

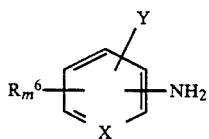

wherein Y is a carboxylic acid group or a sulfonic acid group or a salt thereof, $R^6$ is selected from the group consisting of halogen, hydrogen, $C_1$ to $C_4$ alkyl, carboxylic acid or alkali or alkaline earth metal salt thereof, sulfonic acid or alkali or alkaline earth metal salt thereof, amino, aryl, and $OR^7$ wherein $R^7$ is aryl or $C_1$ to $C_4$ alkyl, X is C, N, O or S, and m is an integer of 1 or 2,

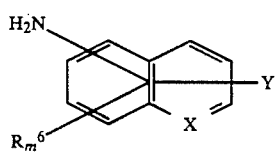

wherein Y, $R^6$ and m have the meanings set forth above,

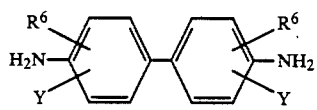

wherein $R^6$ and Y have the meanings given above,

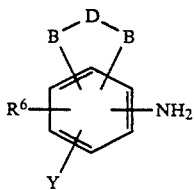

wherein $R^6$ and Y have the meanings given above and B and D are independently selected from the group consisting of O, N, C and $(CH_2)p$ where p denotes an integer of 1 or 2,

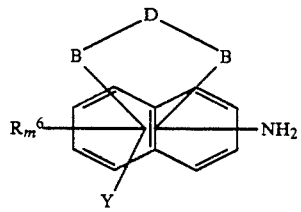

wherein $R^6$, B, D, Y and m have the meanings given above,
the amount of component B-2 and/or B-3 present in the composition when a mixture of B-1 and B-2 and/or B-3 is employed being in the range of from about 0.5 to about 10 mol % based on the quantity of B-1, B-2 and/or B-3 taken together, and the amount of component C being from about 0.25 to about 15 mol % of the pigment, said process comprising:
a. diazotizing compounds having the formula of the categories A and C;
b. coupling a mixture of the resulting diazonium salts with a compound having the formula B-1, B-2, or B 3 or mixtures of B-1, B-2, B-3;
c. filtering and washing the resulting product; and
d. heating said product in air to a temperature of at least about 90° C. to dry said product.

2. The process of claim 1 wherein component A is 3,3'-dichloro-4,4'-diaminobiphenyl.

3. The process of claim 1 wherein component B-1 is selected from the group consisting of
acetoaceto-2-methyl anilide,
acetoaceto- 2-methyoxyanilide,
acetoaceto-4-ethoxyanilide,
acetoaceto-2,4-dimethylanilide,
acetoaceto-2-methyl-4-chloroanilide,
acetoaceto-2-methoxy-5-chloroanilide
acetoaceto-2,4-dimethoxy-5-chloranilide, and
acetoaceto-2,5-dimethoxy-4-chloroanilide.

4. The process of claim 1 wherein component B-2 is selected from the group consisting of 6-acetoacetylaminotetrahydroquinazoline-2,4 dione, 7-aceto acetylaminotetrahydroquinazoline-2,4 -dione, 6-aceto acetylaminotetrahydroquinoxaline-2,3-dione, and 5-aceto acetylaminobenzimiazolone.

5. The process of claim 3 wherein component B-2, B-3 or a mixture of B-2 and B-3 is admixed with the B-1 component, the amount of admixed component being within the range of from about 0.5 to about 10 mol % based on the quantity of all B components taken together.

6. The process of claim 1 wherein component C is selected from the group consisting of 2-amino-5-methyl-benzene sulfonic acid, 2-amino-1-naphthalene sulfonic acid, 2-amino -5-methoxybenzene sulfonic acid, 2-aminobenzoic acid, 3-amino 6-methylebenzene sulfonic acid, 4-aminobenzene sulfonic acid, 1-amino -4-chloro-5-methylbenzene sulfonic acid and salts thereof.

7. The process of claim 6 wherein component C is 2-amino-5-methylbenzene sulfonic acid.

8. The process of claim 6 wherein component C is 2-amino-1-naphthalene sulfonic acid.

9. The process of claim 6 wherein component C is 2-aminobenzoic acid.

10. The process of claim 6 wherein component C is 4-aminobenzene sulfonic acid.

11. The process of claim 6 wherein component C is 5-amino-2-methylbenzene sulfonic acid.

12. The process of claim 6 wherein component C is aniline-2-sulfonic acid.

13. The process of claim 6 wherein component C is 4-aminobenzoic acid.

14. The process of claim 3 wherein component B is acetoacetylated-2,5-dimethoxy -4-chloroaniline.

15. The process of claim 3 wherein component B is acetoacetylated-2,4-dimethylaniline.

16. The process of claim 3 wherein component B is acetoacetylated-2-methyl aniline.

17. The process of claim 1 wherein said diaryl pigment is obtained by coupling a mixture of bis-diazotized 3,3'-dichloro-4,4'-diaminobiphenyl and diazotized 2-amino-5-methylbenzene sulfonic acid or its acid salt with acetylated 2,5-dimethoxy-4-chloroaniline.

18. The process of claim 17 containing said diazotized 2-amino-5-methylbenzene sulfonic acid in an amount of from about 0.1 to about 15 mol percent based on the moles of the acetylated 2,5-dimethoxy-4-chloroanilane coupler.

19. The process of claim 18 wherein said sulfonic acid is present in an amount of from about 0.25 to about 2.5 mol percent based on the moles of the coupler.

20. The process of claim 1 wherein said product is heated to a temperature of about 110° C.

21. The process of claim 1 wherein said dried product is ground an dispersed in an organic solvent.

* * * * *